3,798,320
PRECIPITATION OF BACTERIAL CELLS WITH POLYMERS
Karl Eugene Weiss and Colin McKenzie Cameron, Pretoria, Transvaal, Republic of South Africa, assignors to South African Inventions Development Corporation, Scientia, Pretoria, Transvaal, Republic of South Africa
No Drawing. Filed Sept. 9, 1971, Ser. No. 179,200
Claims priority, application Republic of South Africa, Sept. 18, 1970, 70/6,404, 70/6,407
Int. Cl. C12k 1/00
U.S. Cl. 424—92                                    18 Claims

ABSTRACT OF THE DISCLOSURE

Bacteria are rendered indispersable in aqueous medium, e.g. aqueous culture fluid by means of a linear filamentary non-charged polymer precipitant, preferably a polyalkylene glycol such as PEG within the preferred molecular weight range of 2,000 to 30,000. The invention can be applied to a wide range of applications in the field of immunology, particularly in the manufacture of vaccines. Bacterial matter can be concentrated as a useful product or removed from other substances, e.g. toxins to purify the latter. Thus, i.a. novel vaccine against pulpy kidney disease is produced, containing the immunologically valuable toxoids free of bacteria cells.

BACKGROUND OF THE INVENTION

The present invention relates to the treatment of mixtures comprising bacteria, in particular the fractionation of mixtures comprising a bacterial component.

In our British Pat. No. 1,006,258 (U.S.A. Pat. 3,415,-804) we described and claimed the fractionation and purification of proteinaceous substances using polyethylene glycol as an insolubilizing agent capable of preferentially bringing about the insolubilization (e.g. precipitation) of certain protein species under conditions where certain other proteinaceous species are substantially left in solution. Some bacteria have been precipitated in the past using specific precipitants capable of bringing about sedimentation of some bacteria but not of others.

It has now been discovered surprisingly that polyethylene glycol and certain similar insolubilizing agents are suitable to bring about sedimentation of bacteria in general and can be usefully employed in the production of a variety of useful precipitation and/or fractionation products, including certain vaccines of types which are considered novel per se. The new process can be employed with advantage amongst others for the manufacture of purified bacteria concentrates essentially free of toxins or the purification of vaccines incorporating bacteria plus toxins or toxoids or the manufacture of vaccines composed essentially of toxins or toxoids and from which the bacteria have been removed, including many cases where such purification was hitherto impossible or commercially impractical.

BRIEF SUMMARY OF THE INVENTION

In accordance with the present invention there is provided a process for the treatment of mixtures comprising bacteria comprising the step of rendering at least a part of the said bacteria indispersable in an aqueous medium by the incorporation in said medium of a suitable linear filamentary non-charged polymer precipitant. By "suitable" in this context, we mean in particular that the amount required of substance for the insolubilization, must not increase the viscosity of the aqueous medium at the prevailing temperature to a level where it becomes unduly difficult to carry out the process. Suitable substances are in particular selected from polyalkylene glycols, for example polyethylene glycol, polypropylene glycol or mixed polymers of ethylene glycol and higher homologues such as propylene glycol, dextran or poly-1,4-dihydroxy butaneglycol. Preferably, in all cases the molecular weight of the precipitant is within the range 2,000–30,000. Dextran may be used advantageously.

Examples of other linear filamentary non-charged polymers which, as confirmed by various experiments, can be used but are less preferred at present are nonylphenolethoxylate, polyvinyl alcohol and polyvinyl pyrrolidone.

Because of its ready commercial availability and advantageous properties it is preferred to use polyethylene glycol (PEG) more particular of molecular weight between 2,000 and 30,000, preferably of molecular weight between 4,000 to 9,000, say substantially 6,000. For that reason PEG 6,000 will be stressed in the following.

When using a precipitant other than PEG of M. wt. 6,000 the required amount, equivalent to a known required amount of PEG 6,000, may be calculated in most cases at least approximately from the formula $$\beta = \frac{\bar{V}}{2.303}\left(1+\frac{r_s}{r_r}\right)^3 \quad (1)$$

in which $\beta$ is inversely proportional to the concentration required;

$\bar{V}$=partial spetcific volume of the polymer;
$r_r$=radius of the polymer molecule;
$r_s$=radius or stokes radius of the particle to be precipitated.

In accordance with a particular aspect of the present invention there is provided a process for the fractionation of a mixture comprising a bacterial component which process comprises rendering at least a part of the bacterial component indispersable in an aqueous medium by the incorporation in said medium of a suitable linear filamentary non-charged polymer precipitant, intimately mixing said mixture and aqueous medium comprising the precipitant and separating two phases from one another formed after said mixing, one phase comprising bacterial component rendered indispersable and one other phase being an aqueous phase comprising dispersed therein a portion of the mixture having a composition different from the original mixture, at least in respect of a reduced content of said bacterial component.

In practice the mixture to be fractionated will usually already be in a state of aqueous dispersion, and such aqueous dispersion may be subjected directly to fractionation by the addition thereto of the precipitant up to a concentration at which a bacterial component will be precipitated.

We have investigated a considerable variety of different types of bacteria, differing inter alia also materially in respect of cell shapes and sizes and have found surprisingly that the process in accordance with the present invention is applicable quite generally to substantially all kinds of bacteria of practical significance. In our experience to date all bacteria can be precipitated from aqueous dispersions mostly under more or less similar conditions. This is surprising since previously known precipitants for bacteria such as for example, carboxy methyl cellulose will precipitate only certain bacteria by way of exception and not others. Carboxy methyl cellulose is not a linear filamentary non-charged polymer.

Whilst it is preferred to achieve the fractionation by precipitation from an aqueous medium, it is possible in principle to apply the reverse procedure, that is to say extracting a mixture comprising a bacterial component selectively with an aqueous medium comprising linear filamentary non-charged polymer precipitant in an amount sufficient to suppress the dispersion of the bacterial component in the aqueous medium.

The term "precipitation" and to "precipitate" as used in the present specification is employed in the colloquial sense in which the expressions are generally used in this art, meaning "sedimentation."

For improved fractionations or purifications it is possible to fractionate a mixture repeatedly, either by repeated fractionation steps in accordance with the present invention or by a combination of such fractionation step with other conventional fractionation steps.

When a polyalkylene glycol, more particularly PEG is used as the precipitant, it is preferred to employ a commercial preparation "polyethylene glycol 6,000," the code number being by approximation indicative of the molecular weight. Thus, polyethylene glycol 6,000 as supplied by Shell is stated by those manufacturers as having an average molecular weight between 6,000 and 7,500, according to the determination methods employed by the manufacturers. In any event the molecular weight of the precipitant is not very critical and minor variations in optimum concentrations of PEG due to that parameter are easily determined by a routine experiment, such routine experiment for example, following the general pattern of analogous routine experiments described in our South African Pat. No. 63/834, (British Pat. 1,006,258; U.S. Pat. 3,415,804). Other suitable polyalkylene glycols which may be used instead of or in addition to polyethylene glycol are the polymers of lower homologues of ethylene glycol, in particular propylene glycol or mixed polymers of polyethylene glycol and such homologues, the preferred molecular weight limits being substantially similar to those described for polyethylene glycol, the upper limits being determined primarily by viscosity considerations.

In the case of polyethylene glycol 6,000 we have sometimes observed satisfactory precipitation at concentrations as low as 2% PEG, although in other cases such precipitation at 2% PEG may be rather slow. More frequently concentrations between about 3 and 5% PEG, more particularly 4% PEG are preferred when the precipitation of bacterial matter is a primary objective. Higher concentrations may be employed however, in certain cases where it is desired to coprecipitate with the bacterial matter, certain other components of the mixture, in particular other components of a proteinaceous nature such as toxins.

The process is preferably carried out at a pH between about 5 and 8, more particularly between 5 and 7.6, preferably at about neutral pH, that will say about pH 7. In most cases it is in any event preferable to operate at about neutral pH bearing in mind the properties of the materials involved. At the said pH values we have been able to precipitate bacteria of which a high percentage was not damaged in any way and was still alive. In that respect the process was found to perform better than some known precipitation methods and the process was also found to be much more convenient than centrifugation.

Temperature was not observed to have any important effects on the precipitation itself and precipitations were carried out successfully between about 4° C. and 37° C.

The ionic strength of the aqueous medium may in some cases affect the precipitation. It was observed on certain occasions that a very high ionic strength may inhibit the precipitation of bacteria. The preferred ionic strength is equivalent to a NaCl concentration of about 0.1 to about 0.3 molar, say 0.15 M.

In practice it is usually found convenient to precipitate bacteria from an aqueous dispersion having a concentration of between 0.5 and 2% packed volume.

The present invention may for example be applied to the following general applications:

(a) The concentration and purification of bacteria.

(b) The separation of bacteria from a medium.

(c) The removal of bacteria from other desired components of the mixture, e.g. toxins.

(d) The combined recovery of bacteria together with certain other precipitable components of the mixture, e.g. the combined recovery of bacteria and certain toxins in a purer or more concentrated form than before.

The fact that some bacteria are precipitated readily at a PEG concentration of 2% and others only at 4% indicates the possibility of some forms of fractionation, including the fractionation or separation of pleomorphic or aberrant forms of bacteria.

The process was applied particularly successfully to the manufacture of a novel vaccine against pulpy kidney disease. Thus, in accordance with the present invention there is provided a new vaccine for vaccination of animals against pulpy kidney disease which comprises an immunising content of toxoids derived from the toxins of *Clostridium welchii* type D substantially devoid of cells of these bacteria.

More particularly the said vaccine is substantially based on toxoids derived from the epsilon toxin of the said bacteria.

It was found that such vaccines can be prepared with an immunizing effect substantially as good or even better than that of conventional vaccines in which the bacterial cells are still present.

Also in accordance with the invention there is provided a process for the manufacture of improved vaccines against pulpy kidney disease which comprises the step of sedimenting cells of *Clostridium welchii* type D or a substantially equivalent strain from a culture fluid thereof and converting the supernatant into a vaccine.

More particularly the step of sedimenting is carried out by adding to the said culture fluid a suitable linear filamentary non-charged polymer precipitant, preferably a polyalkylene glycol in an amount sufficient to precipitate the bacterial cells by substantially retaining in solution the desired toxins.

In the case of polyethylene glycol 6,000 the preferred concentration for the precipitation of the cellular matter is between 3 and 5%, more particularly substantially 4%.

The process is preferably carried out at a pH between about 5 and 8, more particularly between 5 and 7.6, preferably at about neutral pH, that will say about pH 7, other parameters being preferably selected as described further above.

DETAILED DESCRIPTION OF PREFERRED EMBODIMENTS

In the following the invention will be further described by way of examples.

EXAMPLE 1

Preparation of vaccine against pulp kidney disease

A culture of *Cl. welchii* type D is prepared in the usual manner for vaccine production. Coarse meat particles derived from the culture medium are allowed to settle out after which the supernatant liquid is siphoned off. In a particular experiment this was found to have a toxin content of 375 lf./ml. and a pH of about 5.

The pH is adjusted to 7.0 with 1 N NaOH after which 4% by weight of PEG 6,000 flakes are added. The mixture is stirred well until the PEG has dissolved completely, whereafter the mixture is allowed to stand for about 18 hours followed by siphoning off the supernatant liquid which is then treated in the usual manner to obtain toxoid suitable for use as a vaccine. It is found that the lf. value is undiminished. However, the product is considerably purer than conventional vaccine.

It is not advisable to employ a very much higher PEG concentration. With 6% PEG the toxin content drops to 300 lf. (limit of flocculation) per ml. indicating that some toxin is precipitated and lost.

Further experiments indicated that this phenomenon can be used in a further fractionation step to concentrate the toxin by precipitating it out at higher PEG concentrations, e.g. up to 20% or even more.

Experiments also showed that the sedimentation of the bacteria must be carried out before formalization for the purpose of converting the toxin into the toxoid. After formalization the bacteria failed to precipitate.

Where treatment with trypsine is resorted to, such should preferably precede the precipitation step with PEG or the like.

EXAMPLE 2

Concentration of *Salmonella gallinarum* (fowl typhoid) as a live caccine

Cultures of two strains of *S. gallinarum* were divided into two batches. One batch was subjected to sedimentation with 4% PEG in order to prepared the bacterial concentrate whereas the other batch was concentrated by conventional centrifugation. No difference in the recovery of live bacteria was detectable. The method in accordance with the invention is superior in that it involves a considerably more convenient and an inexpensive manner of concentration.

EXAMPLE 3

Concentration of live bacteria of *Brucella abortus*

The bacteria were concentrated in a manner similar to the previous example at different pH values and PEG concentrations. Complete sedimentation without loss of viability was achieved at pH values between 6.0 and 7.0 using PEG concentrations between 2 and 5%. Similar results were attained at pH 5 using PEG concentrations between 3 and 5%. At pH 8 the ease of precipitation was similar to that at pH 7. However, there was observed a slight loss of viability.

EXAMPLE 4

Preparation of multiple strain vaccine

Here problems are sometimes experienced in being able to incorporate a large number of strains in adequate concentrations in a given volume of vaccine (live or dead). A polyvalent vaccine was prepared of 8 strains of *Pasteurella multocida* by sedimentation of the bacteria with 4% PEG at pH 7.0.

The immunological value of the vaccine was tested by challenging with the strains A 14 g. and DI supplied by Institut d'Élevage et de Médicine Vétérinaire des Pays Tropicaux.

The immunized mice were more than a thousand times as resistant against infection as the controls. The results were substantially identical to those attained with a similar vaccine produced by centrifugation which is however, very much less convenient to produce.

EXAMPLE 5

Preparation of vaccine against black quarter disease

The protective antigen in this case is a concentrate of the bacteria plus certain toxins.

A culture of *Cl. chauvoei* is spun down, the pH is adjusted to 6.5 and the first precipitation is then carried out with 2% PEG. The sediment comprising mainly debris and only minor amounts of immunizing antigen is discarded. The supernatant is then treated with sufficient PEG to raise the concentration to 8% which results in the precipitation of substantially all material having an immunizing effect.

The resulting concentrated vaccine had an immunizing effect 10 times that of conventional vaccine.

In similar manners to the above described method it is proposed to prepare staphilococcus vaccines as a dead bacterial concentrate from which the toxins have been removed and to prepare improved whooping cough vaccine by freeing the vaccine of toxins. (See in particular Examples 2 to 4.)

What we claim is:

1. A process for the fractional precipitation of particulate bacterial cells from an aqueous dispersion thereof having a pH of about 5–8, which comprises:
   (a) combining said dispersion with a precipitant consisting essentially of a water soluble, linear, filamentary uncharged polymer having a molecular weight of about 2,000–30,000 in an amount sufficient to precipitate at least a portion of said particulate bacterial cells from said dispersion without unduly increasing the viscosity of the aqueous medium to a level at which it becomes difficult to carry out said fractional precipitation process, said precipitant being selected from the group consisting of polyalkylene glycols, nonylphenolethoxylate, polyvinyl alcohol and polyvinylpyrrolidone;
   (b) forming a single homogeneous liquid phase consisting essentially of said dispersions having said polymer precipitant essentially completely dissolved therein; and
   (c) precipitating at least a portion of said bacterial cells as solids from said dispersion.

2. A process according to claim 1 wherein said aqueous dispersion has an ionic strength equivalent to that of a 0.1–0.3 molar aqueous NaCl solution.

3. A process according to claim 1 wherein said aqueous dispersion contains a bacterial toxin dissolved therein and wherein the amount of polymer precipitant added is sufficient to coprecipitate both said bacterial cells and said toxin.

4. Process as claimed in claim 1 carried out with between 3 and 5% by weight PEG serving as a precipitant.

5. Process as claimed in claim 1 wherein bacteria are precipitated from an aqueous dispersion thereof having a concentration of between 0.5 and 2% packed volume.

6. A process as claimed in claim 1 wherein a step of precipitation and separation of bacterial cell particles at one concentration of the precipitant is preceded by a step of sedimentation and separation of relatively coarse debris assisted by the precipitant, but employed at a lower concentration thereof.

7. Process as claimed in claim 1 wherein an aqueous dispersion of *Cl. welchii* and its toxin is treated, the toxin freed of bacterial cell particles being converted into a vaccine.

8. A process as claimed in claim 1 in which the upper limit is 8% by weight.

9. Process as claimed in claim 1 in which the precipitant is a polyalkylene glycol.

10. Process as claimed in claim 9 wherein the precipitant is selected from polymers and mixed polymers of ethylene glycol, propylene glycol and 1,4-dihydroxy butane glycol.

11. Process as claimed in claim 10 wherein the precipitant is polyethylene glycol.

12. Process as claimed in claim 11 wherein the precipitant is polyethylene glycol of molecular weight between 4,000 and 9,000.

13. A process according to claim 1 further comprising separating precipitated bacterial cells from the resultant supernate.

14. A process according to claim 13 further comprising preparing a vaccine from said bacterial cells.

15. A process according to claim 13 further comprising recovering a supernate substantially devoid of bacterial cells.

16. A process according to claim 15 wherein said supernate contains bacterial toxins in solution, further comprising preparing a vaccine from said supernate.

17. A process according to claim 16 wherein said toxins are precipitated by the addition of further polymer precipitant thereto.

18. A process for preparing a vaccine for vaccination of animals against pulpy kidney disease and comprising an immunizing content of toxoids derived from the toxins of a strain of *Clostridium welchii* substantially devoid of cells of these bacteria, which process comprises the step of sedimenting cells of the strain of *Clostridium welchii* from a culture fluid thereof and converting the supernatant into a vaccine and which comprises carrying out said sedimenting with a polyalkylene glycol of molecular weight between 2,000 and 30,000 employed in a concentration between 2% and 6% by weight and at an ionic strength of the aqueous medium equivalent to a NaCl concentration of 0.1 to 0.3 M, and at a pH between 5 and 8.

References Cited
FOREIGN PATENTS

| | | | |
|---|---|---|---|
| 1,006,258 | 9/1965 | Great Britain | 424—92 |
| 901,433 | 7/1962 | Great Britain | 424—92 |

OTHER REFERENCES

Sacks et al., J. Bacteriology, vol. 82, pp. 331–341, 1961 424/92.

RICHARD L. HUFF, Primary Examiner

U.S. Cl. X.R.

195—96

UNITED STATES PATENT OFFICE
CERTIFICATE OF CORRECTION

Patent No. 3,798,320            Dated March 19, 1974

Inventor(s) Karl Eugene Weiss, et al.

It is certified that error appears in the above-identified patent and that said Letters Patent are hereby corrected as shown below:

IN THE HEADING, COLUMN 1: The claims of priority should read

-- Sept. 18, 1970, 70/6,406, 70/6,407 --.

Signed and sealed this 9th day of July 1974.

(SEAL)
Attest:

McCOY M. GIBSON, JR.           C. MARSHALL DANN
Attesting Officer              Commissioner of Patents